US007237641B2

(12) United States Patent
Yanai

(10) Patent No.: US 7,237,641 B2
(45) Date of Patent: Jul. 3, 2007

(54) DRIVING SUPPORT APPARATUS

(75) Inventor: Tatsumi Yanai, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 340 days.

(21) Appl. No.: 10/816,835

(22) Filed: Apr. 5, 2004

(65) Prior Publication Data

US 2004/0215383 A1 Oct. 28, 2004

(30) Foreign Application Priority Data

Apr. 25, 2003 (JP) ........................ P 2003-122241

(51) Int. Cl.
*H04N 7/18* (2006.01)

(52) U.S. Cl. .................. 180/271; 340/435; 340/932.2; 348/148

(58) Field of Classification Search ................ 382/104; 384/148; 340/435, 436, 437, 438, 932.2, 340/937; 701/301; 348/148; 180/271
See application file for complete search history.

(56) References Cited

U.S. PATENT DOCUMENTS

| | | | | |
|---|---|---|---|---|
| 5,249,157 | A * | 9/1993 | Taylor | 340/903 |
| 5,309,137 | A * | 5/1994 | Kajiwara | 340/436 |
| 5,379,353 | A * | 1/1995 | Hasegawa et al. | 382/104 |
| 5,530,420 | A * | 6/1996 | Tsuchiya et al. | 340/435 |
| 5,680,123 | A * | 10/1997 | Lee | 340/937 |
| 6,072,173 | A * | 6/2000 | Soshi et al. | 250/221 |
| 6,259,359 | B1 * | 7/2001 | Fujinami et al. | 340/435 |
| 6,311,123 | B1 * | 10/2001 | Nakamura et al. | 701/96 |
| 6,330,511 | B2 * | 12/2001 | Ogura et al. | 701/301 |
| 6,363,326 | B1 * | 3/2002 | Scully | 701/301 |
| 6,424,273 | B1 * | 7/2002 | Gutta et al. | 340/937 |
| 6,556,133 | B2 * | 4/2003 | Ogura | 340/435 |
| 6,891,563 | B2 * | 5/2005 | Schofield et al. | 348/148 |
| 7,038,577 | B2 * | 5/2006 | Pawlicki et al. | 340/435 |
| 2001/0040505 | A1 * | 11/2001 | Ishida et al. | 340/435 |
| 2001/0052845 | A1 * | 12/2001 | Weis et al. | 340/436 |
| 2003/0165255 | A1 * | 9/2003 | Yanagawa et al. | 382/104 |
| 2003/0169902 | A1 * | 9/2003 | Satoh | 382/104 |
| 2003/0187578 | A1 * | 10/2003 | Nishira et al. | 701/301 |
| 2003/0210807 | A1 * | 11/2003 | Sato et al. | 382/104 |
| 2006/0139782 | A1 * | 6/2006 | Weller et al. | 359/879 |

FOREIGN PATENT DOCUMENTS

| | | |
|---|---|---|
| JP | 60-095699 | 6/1985 |
| JP | 11-353565 | 12/1999 |
| JP | 2002-83297 | 3/2002 |
| JP | 2002-104015 | 4/2002 |
| JP | 2002-354466 | 12/2002 |
| JP | 2003-063430 | 3/2003 |

* cited by examiner

*Primary Examiner*—Paul N. Dickson
*Assistant Examiner*—Leonard McCleary, Jr.
(74) *Attorney, Agent, or Firm*—McDermott Will & Emery LLP

(57) ABSTRACT

A driving support apparatus of the present invention comprises an imaging device which picks up a peripheral image of a vehicle, a detecting device which detects action information of a moving object present around the vehicle, an information generating device which generates determination supporting information for supporting determinations at the time of driving the vehicle based on the action information; an information combining device which combines the determination supporting information with the peripheral image; and a display device which displays the peripheral image combined with the determination supporting information.

9 Claims, 8 Drawing Sheets

DRIVING SUPPORT APPARATUS

BACKGROUND OF THE INVENTION

1. Field of the Invention

The present invention relates to a driving support apparatus which supports determinations of driving actions when a driver of a vehicle takes the driving actions such as changing lanes.

2. Description of the Related Art

Conventionally, in order to monitor peripheral statuses at the time of vehicle running, driving support apparatuses, which are provided with cameras for imaging peripheries and display the images on display screens so as to support the driving operation by drivers, are used (refer to Japanese Patent Application Laid-open No. 2002-354466). When such driving support apparatuses are used, images picked up by the cameras can be displayed on displays in vehicle interiors. Accordingly, even areas which are out of sight of rearview mirrors or the like can be visible, so that the operationality of the drivers can be improved.

SUMMARY OF THE INVENTION

Conventional driving support apparatuses, however, have such a constitution that images picked up by cameras are simply displayed. A driver can check the peripheral status of a vehicle, but the driver cannot easily see the peripheral statuses in perspective. For example, when a vehicle approaching the driver's own vehicle is on a neighboring lane, the driver can recognize that the approaching vehicle is present, but hardly recognize an approaching speed of the vehicle or a distance between the vehicle and the driver's own vehicle.

The present invention has been achieved in order to solve the above problem, and it is an object of the invention to provide a driving support apparatus which supports driving actions such as changing lanes by the driver of the vehicle, in an easier manner.

According to one aspect of the present invention, there is provided a driving support apparatus comprising: an imaging device which picks up a peripheral image of a vehicle; a detecting device which detects action information of a moving object present around the vehicle; an information generating device which generates determination supporting information for supporting determinations at the time of driving the vehicle based on the action information; an information combining device which combines the determination supporting information with the peripheral image; and a display device which displays the peripheral image combined with the determination supporting information.

BRIEF DESCRIPTION OF THE DRAWINGS

The invention will now be described with reference to the accompanying drawings wherein.

DETAILED DESCRIPTION OF THE PREFERRED EMBODIMENTS

Constitutions and operations of a driving support apparatus, as the first and the second embodiments, are explained below with reference to the accompanying drawings.

First Embodiment

A constitution of a driving support apparatus according to the first embodiment of the present invention is explained below with reference to FIG. 1.

Figure 1:
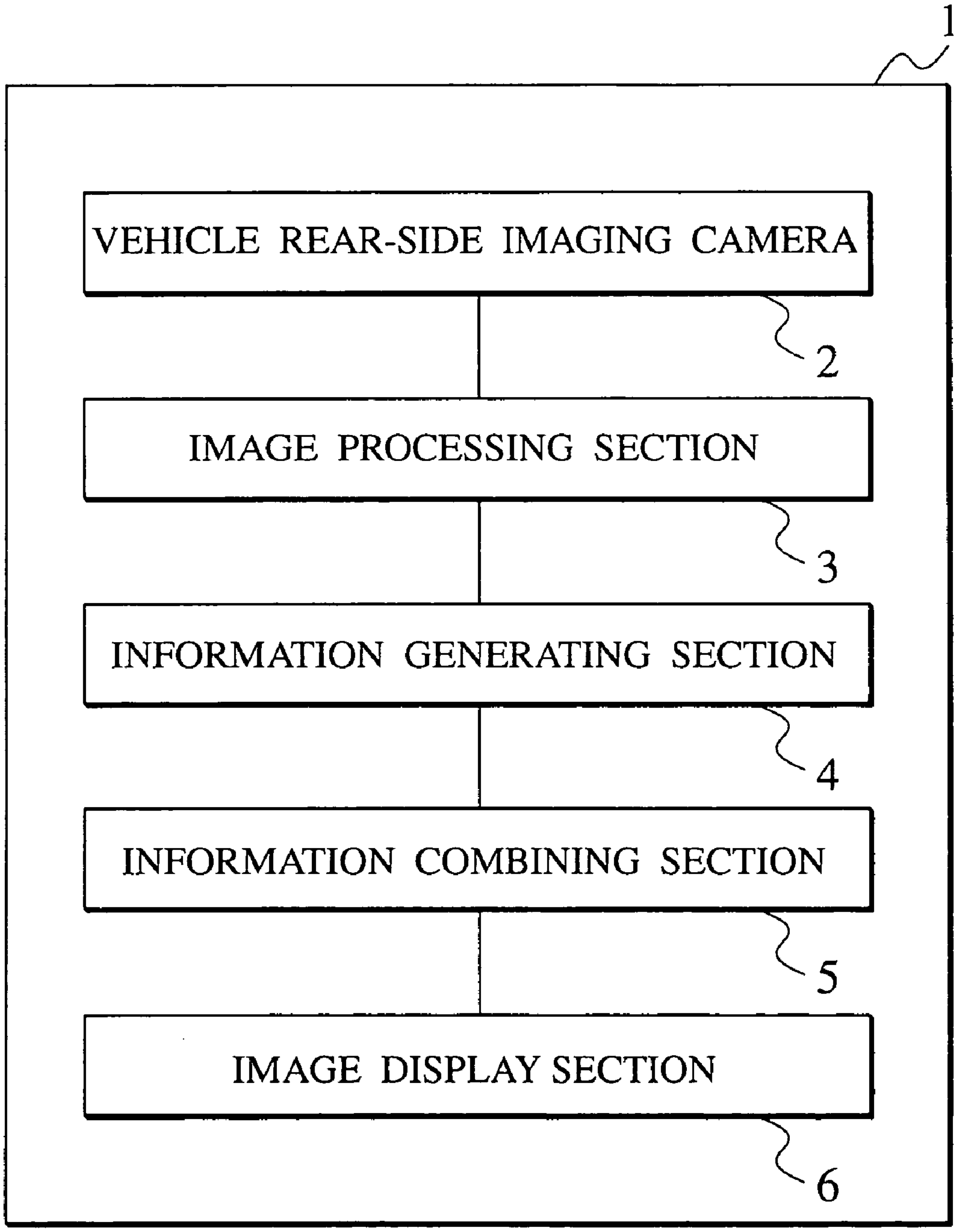
FIG. 1 is a block diagram illustrating a constitution of a driving support apparatus according to the first embodiment of the present invention.

The driving support apparatus 1 according to the first embodiment of the present invention has, as shown in FIG. 1, a vehicle rear-side imaging camera (imaging device) 2, an image processing section for detecting moving objects (detecting device) 3, an information generating section (information generating device) 4, an information combining section (information combining device) 5, and an image display section (display device) 6 as main components.

The imaging camera 2 is attached to the left and right portions on a front end of a vehicle. The imaging cameras 2 pick up images in a rear-side direction of the vehicle. The imaging cameras 2 input the data of the picked-up rear-side images to the image processing section 3 and the information combining section 5.

The image processing section 3 analyzes the data of the images in the rear-side direction of the vehicle input from the imaging cameras 2, so as to detect whether a moving object is present in the rear-side direction of the vehicle, a speed difference V between the moving object and the vehicle, and a distance L between the vehicle and the moving object. In other words, the image processing section 3 analyzes the data of the images, so as to detect action information of the moving object present around the vehicle. The image processing section 3 inputs the detected results to the information generating section 4. The methods of detecting the presence of the moving object, the speed difference V between the moving object and the vehicle, and the distance L between the vehicle and the moving object are detailed later.

On the basis of the information input from the image processing section 3, the information generating section 4 generates determination information for supporting determinations by a driver at the time of driving the vehicle. The information generating section 4 inputs the generated determination information into the information combining section 5.

The information combining section 5 combines the data of the images in the rear-side direction of the vehicle input from the imaging cameras 2 with the determination information input from the information generating section 4. The information combining section 5 generates rear-side information which is combined with the determination information. The information combining section 5 inputs the data of the rear-side image combined with the determination information into the image display section 6.

The image display section 6 includes a display device such as a liquid crystal display device, and displays the image in the rear side direction of the vehicle, which is input from the information combining section 5 and is combined with the determination information.

An operation of the driving support apparatus 1 is detailed below with reference to the flowchart of FIG. 2.

Figure 2:
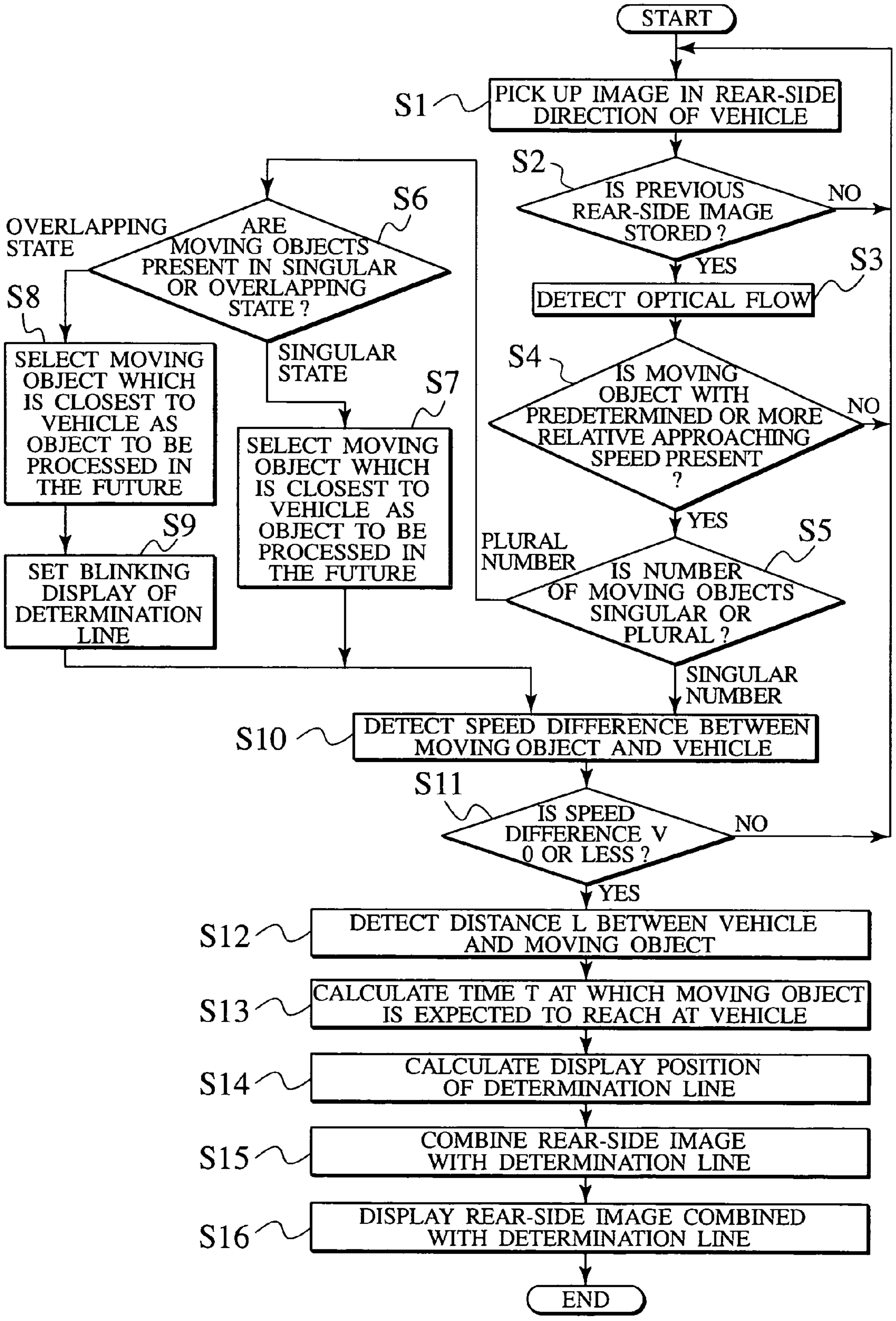
FIG. 2 is a flowchart illustrating an operation of the driving support apparatus shown in FIG. 1.

In the flowchart of FIG. 2, when a starter switch of the vehicle is turned ON, the process is started, and the driving support process proceeds to step S1. The driving support process explained below is repeatedly executed until the starter switch is turned OFF.

The information generating section 4 generates a determination line as the determination information which represents a range where it takes predetermined time (for example, five seconds) for the moving object to reach the vehicle.

The imaging cameras 2 pick up images in the rear-side direction of the vehicle, and input the data of the picked-up rear-side images into the image processing section 3 at step S1. As a result, step S1 is completed, and the driving support process proceeds from step 1 to step S2.

The image processing section 3 determines at step S2 whether data of previous (on one frame before) rear-side images are stored. As a result of the determination, when the data of the previous rear-side images are not stored, the image processing section 3 returns the driving support process from step S2 to step S1. On the other hand, when the data of the previous rear-side images are stored, the image processing section 3 advances the driving support process from step S2 to step S3.

The image processing section 3 compares the data of the previous rear-side images with the data of the rear-side images picked up this time so as to detect an optical flow at step S3. The "optical flow" means a speed vector in each point in an image. The optical flow is detected in a manner that the points in two images are compared with one another by an image processing method such as a block matching method or a gradient method. As a result, step S3 is completed, and the driving support process proceeds from step S3 to step S4.

The image processing section 3 determines at step S4 whether an approaching moving object having a predetermined or more relative speed is present in the rear-side direction of the vehicle based on the detected result of the optical flow. As a result of the determination, when no moving object is present, the image processing section 3 returns the driving support process from step S4 to step S1. On the other hand, when a moving object is present, the image processing section 3 advances the driving support process from step S4 to step S5.

The image processing section 3 determines a number of approaching moving objects having a predetermined or more relative speed at step S5 based on the detected result of the optical flow. As a result of the determination, when a number of moving objects is singular, the image processing section 3 advances the driving support process from step S5 to step S10. On the other hand, when a number of moving objects is plural, the image processing section 3 advances the driving support process from step S5 to step S6.

Figure 3A:
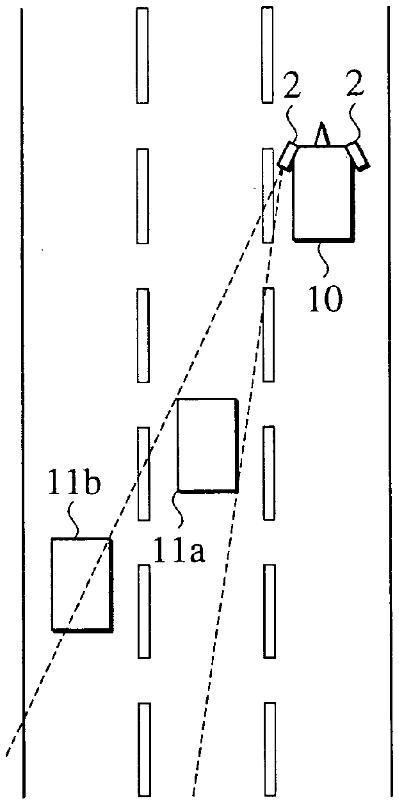
FIGS. 3A and 3C are views for explaining a process when a plurality of moving objects are present in peripheral images in an overlapping state.
Figure 3B:
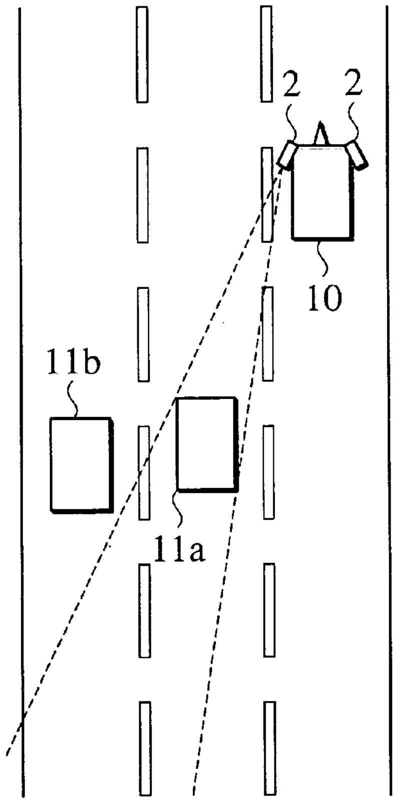
FIGS. 3B and 3D are views for explaining a process when a plurality of moving objects are present in peripheral images in a singular state.
Figure 3C:
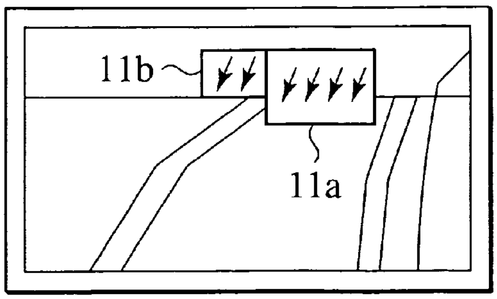
Figure 3D:
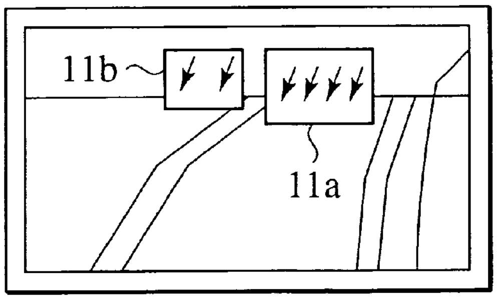

The image processing section 3 determines at step S6 whether a plurality of the moving objects are present in an overlapped or singular state as shown in FIGS. 3A to 3D. FIGS. 3C and 3D illustrate the peripheral images picked up by the imaging cameras 2 when the vehicle 10 and two moving objects 11*a* and 11*b* establish positional relationships shown in FIGS. 3A and 3B, and illustrate the states that the two moving objects 11*a* and 11*b* are present in the overlapped and singular states, respectively. In general, moving objects have the optical flow which is different from that of fixed objects such as roads and traffic signs. The determination can be made whether a plurality of moving objects are present in the overlapped or singular state by calculating a number of ranges including different optical flows (arrow shown in FIGS. 3C and 3D).

As a result of the determination process at step S6, when a plurality of moving objects are present in the singular state, the image processing section 3 selects an object, which is the closest to the vehicle from the moving objects present in the singular state, as an object to be processed in the future at step S7. As a result, step S7 is completed, and the driving support process proceeds from step S7 to step S10.

On the other hand, as a result of the determination at step S6, when the moving objects are present not in the singular state but in the overlapping state, the image processing section 3 selects the moving object which is the closest to the vehicle from the moving objects present in the overlapping state at step S8. As a result, step S8 is completed, and the driving support process proceeds from step S8 to step S9.

The information combining section 5 sets blinking display of the determination lines at step S9 so that when the image display section 6 displays the rear-side images which are combined with the determination lines as the determination information, the determination lines are displayed in a blinking manner. As a result, step S9 is completed, and the driving support process proceeds from step S9 to step S10.

The image processing section 3 detects the speed difference V between the moving objects and the vehicle at step S10. As a result, step S10 is completed, and the driving support process proceeds from step S10 to step S11.

The image processing section 3 determines at step S11 whether the detected speed difference V is 0 or less. That the speed difference V is 0 or less means that the moving object is faster than the vehicle, namely, the moving object is approaching the vehicle. As a result of the determination, when the speed difference V is not 0 or less, the image processing section 3 returns the driving support process from step S 11 to step S1. On the other hand, when the speed difference V is 0 or less, the image processing section 3 advances the driving support process from step S1 to step S12.

Figure 4A:
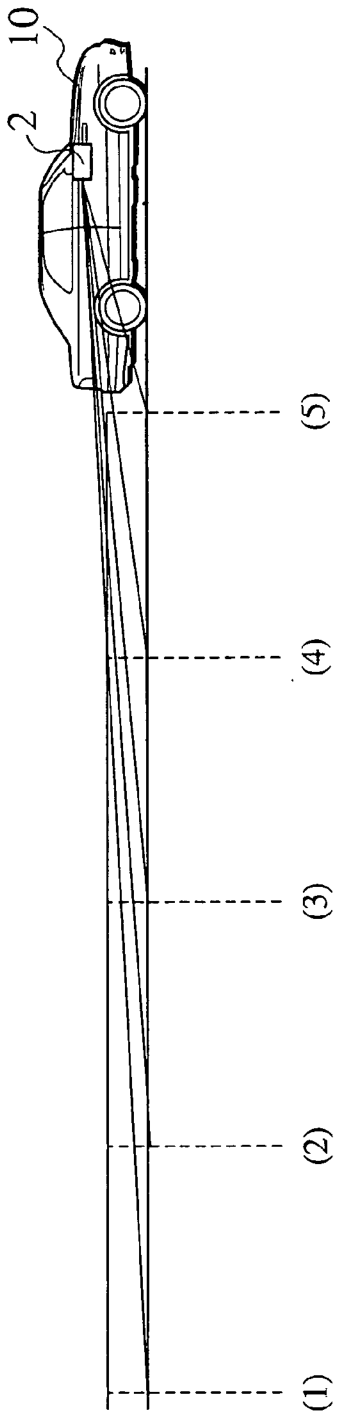
FIGS. 4A and 4B are views for explaining a method of calculating a speed of a moving object and a distance between the moving object and a vehicle.
Figure 4B:
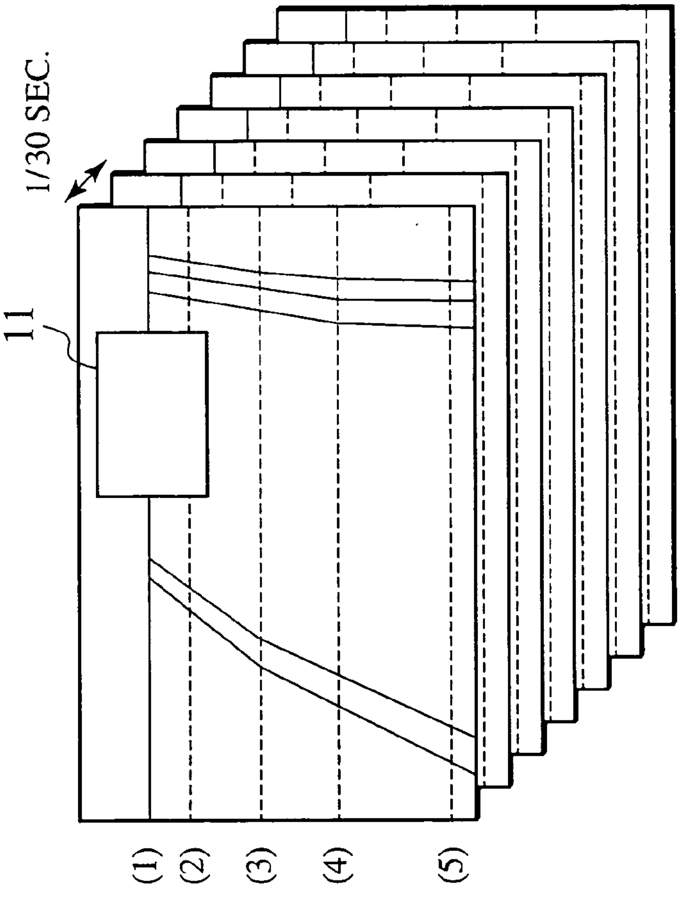

The image processing section 3 detects the distance L between the vehicle and the moving objects at step S12, and inputs the information relating to the distance L as well as the speed difference V detected at step S10 into the information generating section 4. As shown in FIGS. 4A and 4B, the speed difference V and the distance L can be calculated by using the data of rear-side images picked up by the imaging cameras 2 with a predetermined cycle of 1/30 second or the like so as to relate the positions of the moving objects in the images with the distance between the moving objects and the vehicle. The positions in the images and the distances from the vehicle 10 do not establish a proportional relationship, but they can have one-to-one correspondence. In the example of FIGS. 4A and 4B, the distances (1) to (5) from the vehicle 10 shown in FIG. 4A correspond to the positions (1) to (5) in the images shown in FIGS. 4B, respectively. As a result, step S12 is completed, and the driving support process proceeds from step S12 to step S13.

The information generating section 4 calculates time T (=L/V) at which the moving object is expected to reach the vehicle based on the input information about the speed difference V and the distance L at step S13. As a result, step S13 is completed, the driving support process proceeds from step S13 to step S14.

In the process of step S14, the information generating section 4 calculates display positions of the determination lines representing the range of the time required for the moving object to reach the vehicle, and inputs image data and position data of the determination lines into the information combining section 5. When the blinking display of the determination lines are set at step S9, the information generating section 4 inputs the blinking display set data into the information combining section 5. As a result, step S14 is completed, and the driving support process proceeds from step S14 to step S15.

The information combining section 5 generates the data of the rear-side images combined with the determination lines based on the data input from the information generating section 4, and inputs the generated data of the rear-side images into the image display section 6 at step S15. As a result, step S15 is completed, and the driving support process proceeds from step S15 to step S16.

The image display section 6 displays the rear-side images combined with the determination lines using the data input from the information combining section 5 at step S16. As a result, step S16 is completed, and the driving support process returns to START.

Figure 5A:
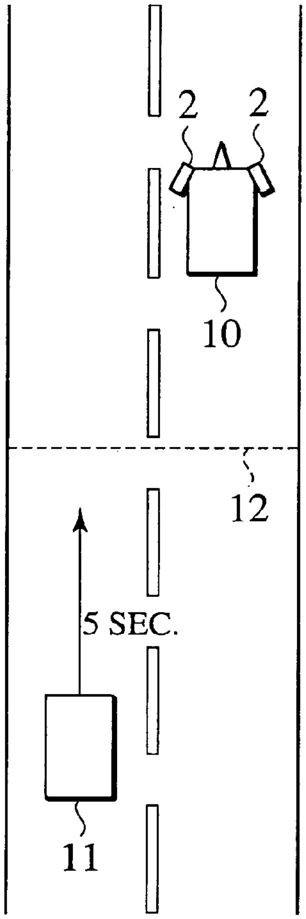
FIGS. 5A to 5F are views illustrating states that the peripheral image combined with a determination line change according to a change in the distance between the vehicle and the moving object.
Figure 5B:
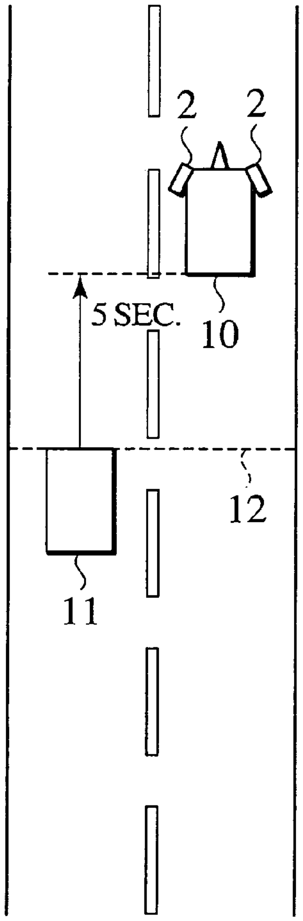
Figure 5C:
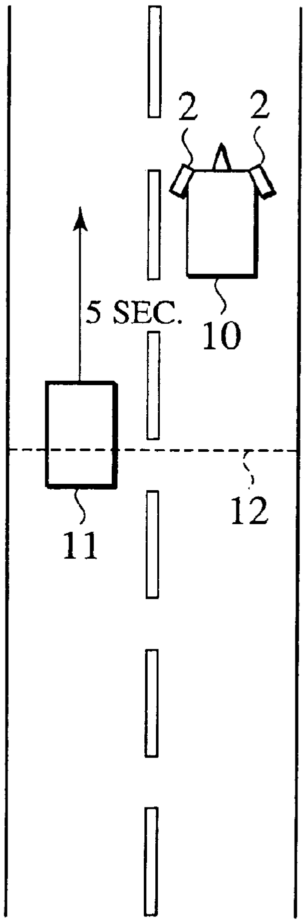
Figure 5D:
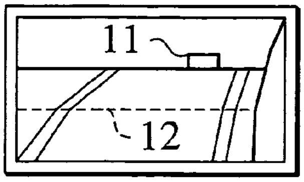
Figure 5E:
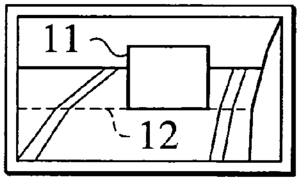
Figure 5F:
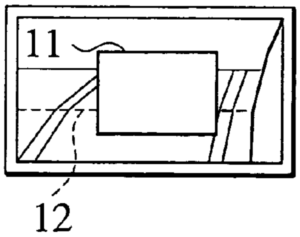

The driving support process is specifically explained. In the driving support apparatus 1 according to the first embodiment of the present invention, as shown in FIGS. 5A, 5B, and 5C, the moving object 11, which moves on a lane different from that on which the vehicle 10 runs, approaches the vehicle 10. In this case, the image display section 6 displays the images in the rear-side direction of the vehicle 10 combined with the determination line as shown in FIGS. 5D, 5E and 5F. The determination lines 12 represents a range where it takes five seconds for the moving object 11 to reach the vehicle 10. As a result, a driver refers to the positional relationship between the image of the moving object 11 and the image of the determination lines 12 displayed in the rear-side image so as to recognize the time period for which the moving object 11 reaches the vehicle 10. Thereby, the driver can smoothly shift the vehicle 10 to the lane on which the moving object 11 moves based on the recognized result. The display position of the determination lines 12 is determined according to the speed difference V and the distance L. Accordingly, the display position of the determination lines 12 changes, when the speed of the moving object changes.

More specifically, when the vehicle 10 and the moving object 11 establishes a positional relationship shown in FIG. 5A, the rear-side image, which shows that the moving object 11 is positioned on a rear side of the determination line 12, is displayed as shown in FIG. 5D. Accordingly, the driver recognizes that it is five or more seconds until the moving object 11 reaches the vehicle 10, and can smoothly shift the vehicle 10 to the lane on which the moving object 11 moves.

Further, when the vehicle 10 and the moving object 11 establish a positional relationship shown in FIG. 5B, the rear-side image, which shows that the moving object 11 is positioned on the determination line 12, is displayed as shown in FIG. 5E. Accordingly, the driver recognizes that the moving object 11 reaches the vehicle 10 five seconds later, and can determine whether the vehicle 10 should change the lane to the one on which the moving object 11 is moving.

Further, when the vehicle 10 and the moving object 11 establish a positional relationship shown in FIG. 5C, the rear-side image, which shows that the moving object 11 is positioned short of the determination line 12, is displayed as shown in FIG. 5F. Accordingly, the driver recognizes that the moving object 11 reaches the vehicle 10 within five seconds, and can stop changing the lane to the one on which the moving object 11 is moving.

Second Embodiment

The second embodiment is explained below with reference to the drawings, but the explanation of like portions as those in the first embodiment is omitted.

The constitution of the driving support apparatus according to the second embodiment of the present invention is explained with reference to FIG. 6.

Figure 6:
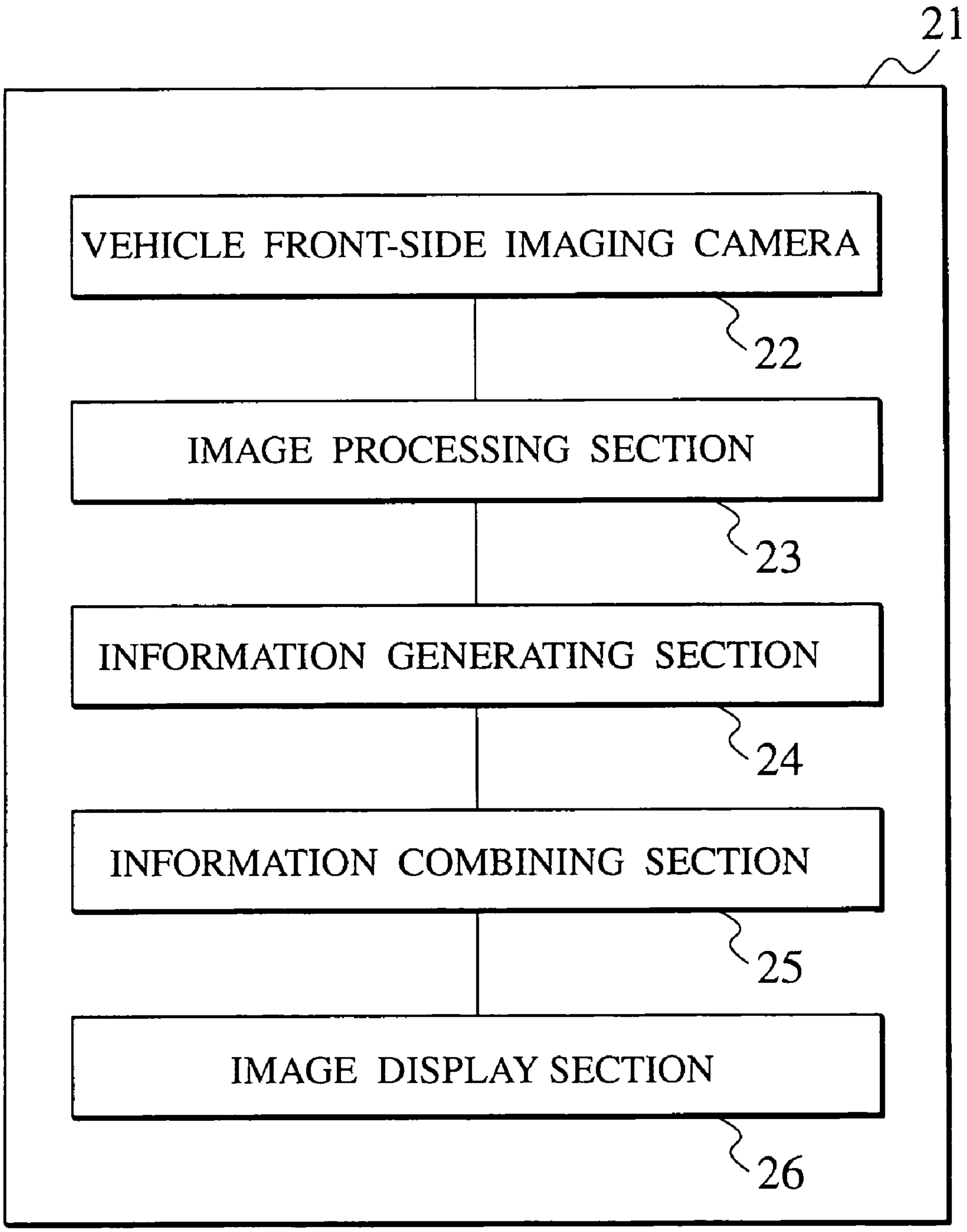
FIG. 6 is a block diagram illustrating the constitution of the driving support apparatus according to the second embodiment of the present invention.

As shown in FIG. 6, the driving support apparatus 21 according to the second embodiment of the present invention has a vehicle front-side imaging camera (imaging device) 22, an image processing section for detecting moving objects (detecting device) 23, an information generating section (information generating device) 24, an information combining section (information combining device) 25, and an image display section (display device) 26 as main components.

The imaging cameras 22 are attached to left and right portions of the front ends of the vehicle. The imaging cameras 22 pick up images in a front-side direction of the vehicle. The imaging cameras 22 input data of picked-up front-side images into the image processing section 23 and the information combining section 25.

The image processing section 23 analyzes the data of the images in the front-side direction of the vehicle input from the imaging cameras 22 so as to detect presence of a moving object, a speed difference V between a moving object and the vehicle, and a distance L between the moving object and the vehicle. The image processing section 23 inputs the detected results into the information generating section 24.

The information generating section 24 generates determination information based on the information input from the image processing section 23. The information generating section 24 inputs the generated determination information into the information combining section 25.

The information combining section 25 combines the data of the images in the front-side direction of the vehicle input from the imaging cameras 22 with the determination information input from the information generating section 24 so as to generate the front-side image which is combined with the determination information. The information combining section 25 inputs the data of the front-side images which is combined with the determination information into the image display section 26.

The image display section 26 includes a display device such as a liquid crystal display device, and displays the images in the front-side direction of the vehicle which are input from the information combining section 25 and is combined with the determination information.

The operation of the driving support apparatus 21 is detailed below with reference to the flowchart in FIG. 7.

Figure 7:
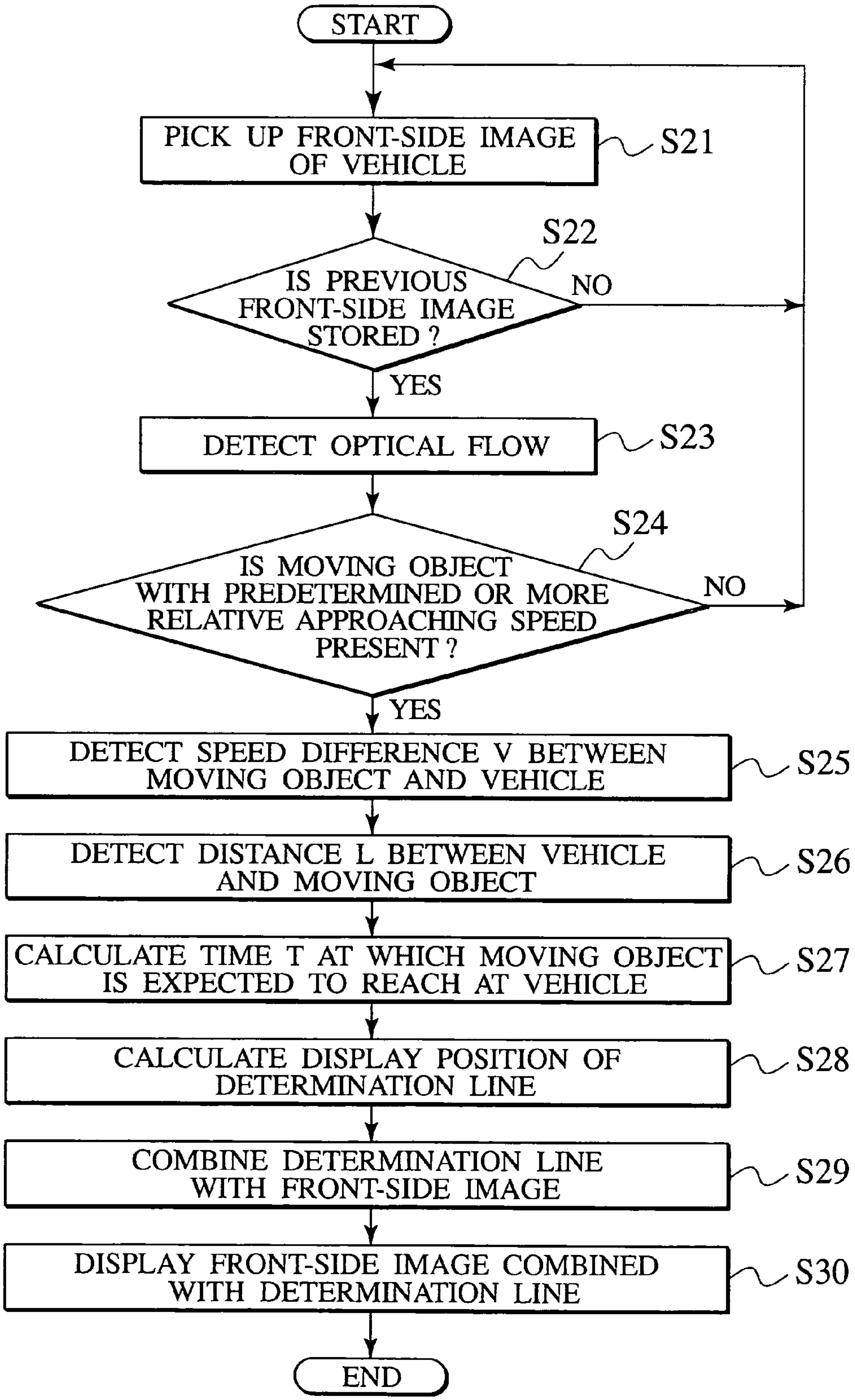
FIG. 7 is a flowchart illustrating the operation of the driving support apparatus shown in FIG. 6.

The flowchart in FIG. 7 is started accordingly when the starter switch of the vehicle is turned ON, and the driving support process proceeds to step S21. The driving support process explained below is repeatedly executed until the starter switch is turned OFF. The information generating section 4 generates the determination lines as the determination information similarly to the first embodiment.

The imaging cameras 22 pick up images in the front-side direction of the vehicle and input the data of the picked-up front-side images into the image processing section 23 at step S21. As a result, step S21 is completed, and the driving support process proceeds from step S21 to step S22.

The image processing section 23 determines at step S22 whether data of the previous front-side images are stored. As a result of the determination, when the data of the previous front-side images are not stored, the image processing section 23 returns the driving support process from step S22 to step S21. On the other hand, when the data of the previous front-side images are stored, the image processing section 23 advances the driving support process from step S22 to step S23.

The image processing section 23 compares the data of the previous front-side images with the data of the front-side images picked up this time so as to detect an optical flow at step S23. As a result, step S23 is completed, and the driving support process proceeds from step S23 to the step S24.

The image processing section 23 determines at step S24 whether a moving object having a speed not lower than a predetermined relative approaching speed is present in the front-side direction of the vehicle based on the detected result of the optical flow. As a result of the determination, when no moving object is present, the image processing section 23 returns the driving support process from step S24 to step S21. On the other hand, when a moving object is present, the image processing section 23 advances the driving support process from step S24 to step S25.

The image processing section 23 detects the speed difference V between the moving object and the vehicle at step S25. Step S25 is completed, and the driving support process proceeds from step S25 to step S26.

The image processing section 23 detects the distance L between the vehicle and the moving object at step S26, and inputs the information about the distance L as well as the speed difference V detected at step S25 into the information generating section 24. As a result, step S26 is completed, and the driving support process proceeds from step S26 to step S27.

The information generating section 24 calculates time T at which the moving object is expected to reach the vehicle at step S27 based on the input information about the speed difference V and the distance L. As a result, step S27 is completed, and the driving support process proceeds from step S27 to step S28.

The information generating section 24 calculates a position of the determination line which represents a range of predetermined time required for the moving object to reach the vehicle at step S28. The information generating section 24 inputs image data and position data of the determination lines into the information combining section 25. As a result, step S28 is completed, and the driving support process proceeds from step S28 to step S29.

The information combining section 25 generates the data of the front-side images which is combined with the determination lines at step S29 based on the data input from the information generating section 24. The information combining section 25 inputs the generated data of the front-side images into the image display section 26. As a result, step S29 is completed, and the driving support process proceeds from step S29 to step S30.

The image display section 26 uses the data input from the information combining section 25, and displays the front-side images which is combined with the determination lines at step S30. As a result, step S30 is completed, and the driving support process returns from step S30 to step S21.

Figure 8A:
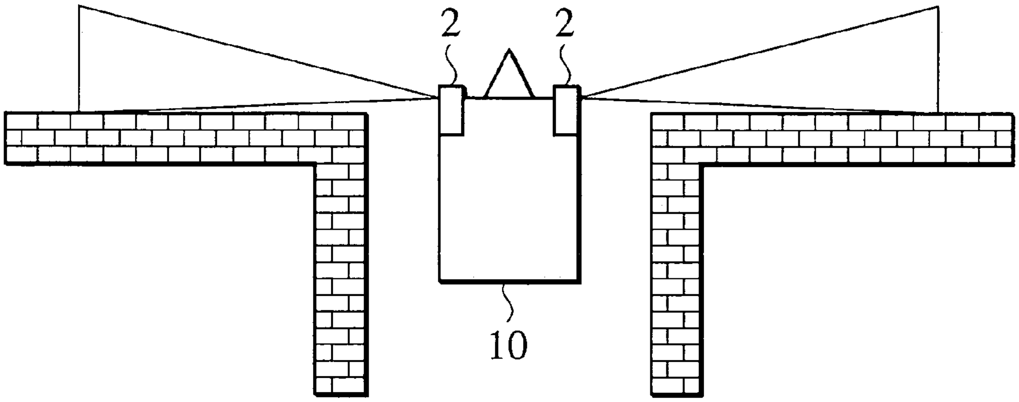
FIGS. 8A and 8B are diagrams illustrating one example of a front-side image displayed and output by the driving support apparatus shown in FIG. 6.
Figure 8B:
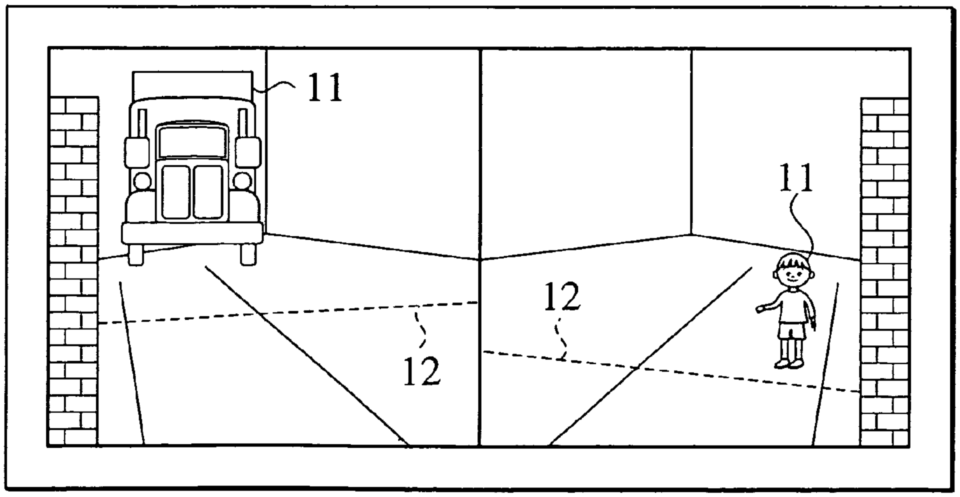

The driving support process is explained specifically. In the driving support apparatus 21 according to the second embodiment of the present invention, the imaging cameras 22 pick up the images in the front-side direction of the vehicle 10 as shown in FIG. 8A. The information combining section 25 outputs the front-side images, which is combined with the determination lines 12 which represent the range of predetermined time required for the moving object 11 present in the front-side direction of the vehicle 10 to reach the vehicle 10, as shown in FIG. 8B. According to this process, even when the driver approaches a visibly obstructed intersection, the driver refers to the positional relationship between the moving object 11 and the determination line 12 in the output front-side image, thereby being capable of easily taking suitable driving actions such as avoiding the moving object 11.

As is clear from the above explanation, according to the driving support apparatus according to the first and the second embodiments, the imaging cameras pick up images in the rear-side or front-side direction of the vehicle, and the image processing section determines whether a moving object is present in the picked-up rear-side or front-side images. When the moving object is present in the picked-up rear-side or front-side images, the information generating section generates determination information for supporting the determination by the driver at the time of driving the vehicle. Further, the information combining section generates the rear-side or front-side images which are combined with the generated determination information, and the image display section displays the rear-side or front-side images which are combined with the driver supporting information. According to such a constitution, the driver refers to the rear-side or front-side images and the driver supporting information, thereby being capable of easily taking driving actions such as changing lanes.

According to the driving support apparatus in the first and the second embodiments of the present invention, when the moving object is approaching the vehicle in the rear-side or front-side direction, the information generating section calculates time required for the moving object to reach the vehicle so as to generate determination information based on the calculated result. According to such a constitution, the driver can take driving actions such as changing lanes based on the time required for the moving object to reach the vehicle.

Further, according to the driving support apparatus in the first and the second embodiments of the present invention, when the moving object is approaching the vehicle in the rear-side or front-side direction, the information combining section combines the determination line which represents the range of predetermined time required for the moving object to reach the vehicle with the rear-side or front-side images. According to such a constitution, the driver refers to the positional relationship between the moving object and the determination lines in the rear-side or front-side images, thereby being capable of easily determining margin time before the moving object reaches the vehicle.

According to the driving support apparatus in the first and the second embodiments of the present invention, the image processing section detects presence or absence of the moving object by detecting the optical flow. Thus, the imaging process and the moving object detecting process for the rear-side or front-side images can be executed simultaneously.

According to the driving support apparatus in the first and the second embodiments of the present invention, the information generating section generates a determination line based on the speed difference V between the moving object and the vehicle. Accordingly, the information generating section can accurately calculate time required for the moving object to reach the vehicle.

The entire content of a Japanese Patent Application No. P2003-122241 with a filing date of Apr. 25, 2003 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A driving support apparatus, comprising:

an imaging device which picks up a peripheral image of a vehicle;

a detecting device which detects a speed difference and a distance between the vehicle and a moving object present around the vehicle;

an information generating device which calculates a time at which the moving object is expected to reach the vehicle based on the speed difference and the distance, and calculates a display position of a determination supporting information representing a range of a predetermined time required for the moving object to reach the vehicle;

an information combining device which combines the determination supporting information with the peripheral image; and a display device which displays the peripheral image combined with the determination supporting information.

2. The driving support apparatus of claim 1, wherein when the moving object approaches the vehicle, the information combining device combine s a range, where a margin time for a driving action intended by a driver of the vehicle is secured, with the peripheral image based on the time at which the moving object is expected to reach the vehicle.

3. The driving support apparatus of claim 2, wherein the driving action is a shift of the vehicle to a lane on which the moving object moves when the moving object moves on the lane different from that on which the vehicle runs and approaches the vehicle, and the range where the margin time is secured is a distance between the vehicle and the moving object, in which the vehicle can smoothly change lanes.

4. The driving support apparatus of claim 1, wherein the detecting device detects an action information of the moving object present in the peripheral image according to an image process.

5. The driving support apparatus of claim 1, wherein the determination supporting information is a determination line.

6. A driving support apparatus, comprising:

imaging means for picking up a peripheral image of a vehicle;

detecting means for detecting a speed difference and a distance between the vehicle and a moving object present around the vehicle;

information generating means for calculating a time at which the moving object is expected to reach the vehicle based on the speed difference and the distance, and for calculating a display position of a determination supporting information representing a range of a predetermined time required for the moving object to reach the vehicle;

information combining means for combining the determination supporting information with the peripheral image; and display means for displaying the peripheral image combined with the determination supporting information.

7. The driving support apparatus of claim 6, wherein the determination supporting information is a determination line.

8. A method for supporting a driving, comprising:

picking up a peripheral image of a vehicle;

detecting a speed difference and a distance between the vehicle and a moving object present around the vehicle;

calculating a time at which the moving object is expected to reach the vehicle based on the speed difference and the distance, and calculating a display position of a determination supporting information representing a range of a predetermined time required for the moving object to reach the vehicle;

combining the determination supporting information with the peripheral image; and displaying the peripheral image combined with the determination supporting information.

9. The method for supporting a driving of claim 8, wherein the determination supporting information is a determination line.

* * * * *